United States Patent [19]
Chandler et al.

[11] Patent Number: 6,039,630
[45] Date of Patent: Mar. 21, 2000

[54] APPARATUS AND METHOD FOR CALIBRATING PRESSURE EXISTING BETWEEN OPTICAL FIBERS AND A POLISHING PAD DURING A POLISHING PROCESS

[75] Inventors: William Keith Chandler, Woodsboro; Nadir Shah, Elkridge; Waqar Mahmood, Odenton; Andrei Csipkes, Savage, all of Md.

[73] Assignee: Ciena Corporation, Linthicum, Md.

[21] Appl. No.: 09/031,816

[22] Filed: Feb. 27, 1998

[51] Int. Cl.[7] ............................................. B24B 49/00
[52] U.S. Cl. ........................... 451/6; 451/41; 451/278
[58] Field of Search ............................ 451/6, 7, 10, 41, 451/42, 278, 279, 384, 390

[56] References Cited

U.S. PATENT DOCUMENTS

| | | | |
|---|---|---|---|
| 5,038,524 | 8/1991 | Moulin | 51/209 R |
| 5,403,227 | 4/1995 | Franklin et al. | 451/168 |
| 5,447,464 | 9/1995 | Franklin et al. | 451/28 |
| 5,503,590 | 4/1996 | Saitoh et al. | 451/11 |
| 5,516,328 | 5/1996 | Kawada | 451/259 |
| 5,547,418 | 8/1996 | Takahashi | 451/278 |
| 5,643,064 | 7/1997 | Grinderslev et al. | 451/378 |
| 5,674,114 | 10/1997 | Miller et al. | 451/278 |
| 5,711,701 | 1/1998 | Grinderslev et al. | 451/378 |
| 5,720,653 | 2/1998 | Miller et al. | 451/278 |
| 5,743,787 | 4/1998 | Ishiyama et al. | 451/41 |

Primary Examiner—Timothy V. Eley
Assistant Examiner—Dung Van Nguyen
Attorney, Agent, or Firm—Daniel N. Daisak; David L. Soltz

[57] ABSTRACT

A calibration apparatus and method for a polishing machine includes a ferrule surrounding a polishing pad and a plurality of sensors attached to the ferrule. Each of the sensors is directed at a location where optical fibers extending downwardly from a leveling device contact the polishing pad. The sensors are infrared sensors that detect a heat signature generated by friction at the contact point between the optical fibers and the polishing pad as the polishing pad spins and revolves relative to the leveling device. The heat signature that is generated corresponds to the pressure existing between the optical fibers and the polishing pad.

12 Claims, 5 Drawing Sheets

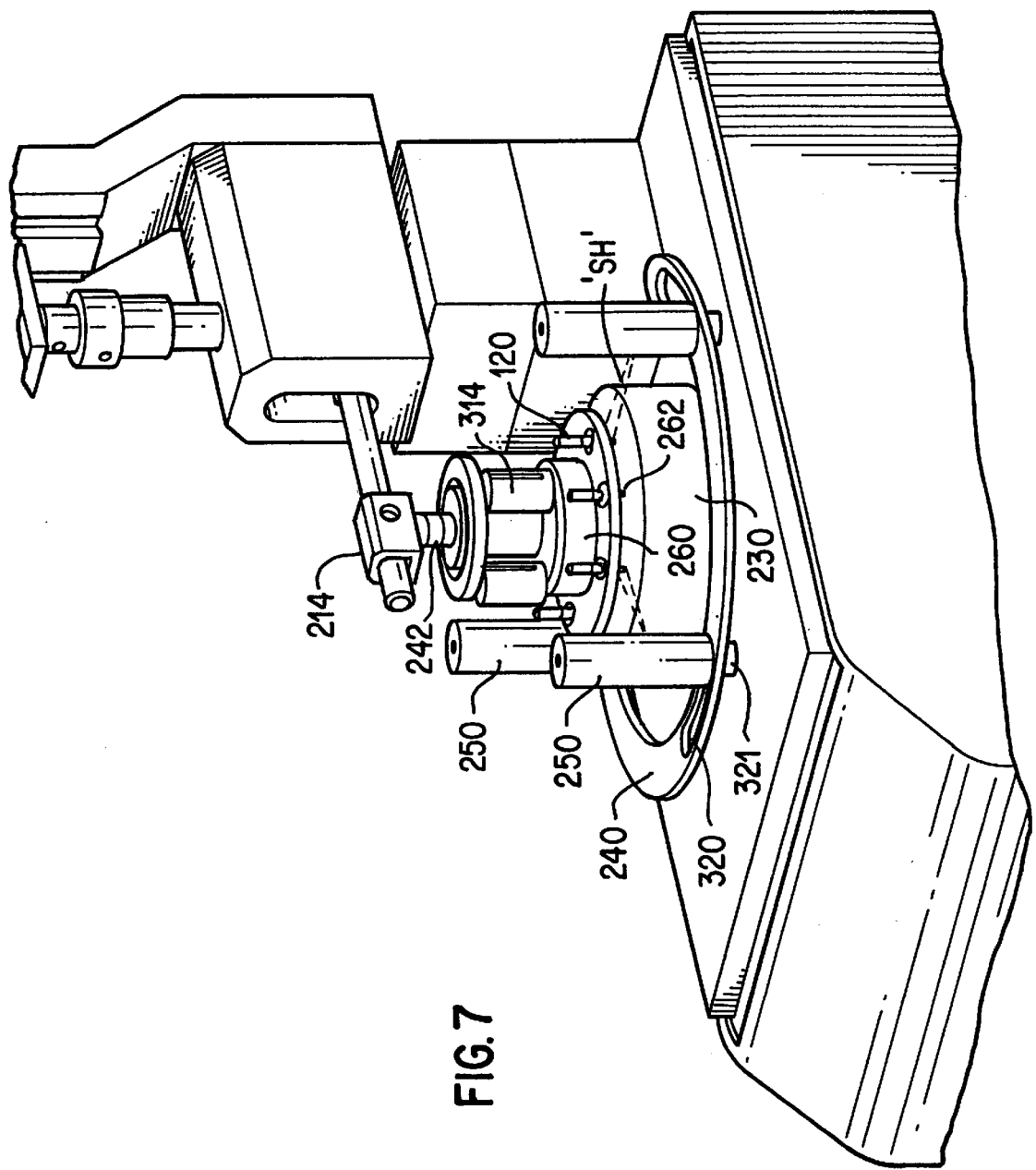

APPARATUS AND METHOD FOR CALIBRATING PRESSURE EXISTING BETWEEN OPTICAL FIBERS AND A POLISHING PAD DURING A POLISHING PROCESS

BACKGROUND OF THE INVENTION

1. Field of the Invention

The present invention generally relates to polishing optical fibers after they have been leveled, and more particularly, to an apparatus for determining and calibrating the pressure existing between a polishing pad and optical fibers that are being polished to ensure polishing uniformity.

2. Description of the Related Art

Optical fibers are very light, very fragile, and have very small dimensions. During their initial manufacture, there are practical limitations on the lengths of optical fibers that can be drawn. Therefore, the connections between the fibers to create longer designated lengths of fiber are accomplished by splicing. In addition, optical fibers or optical devices must be connected to pieces of terminal equipment, such as optical transmitters and optical receivers, to create functioning optical systems.

The nature of the fibers themselves, both in the material used in their fabrication and in the minute physical dimensions involved, combined with submicron alignment requirements, make connectorization operations difficult. Problems with efficient transfer of energy, minimized optical reflections, and mechanical integrity must be addressed. The complexities of interconnecting the fibers demands careful attention to connector design and a high level of precision in polishing operations.

Optical losses caused by poor connections or poor polishing operations may take many forms. Of course, lateral or axial misalignment of the fibers will cause less than optimal light transfer. Care should also be taken to reduce Fresnel reflection losses, which may be introduced by both the glass-to-air and air-to-glass interfaces if end separation between fibers is excessive. Also, the quality of both fiber ends has an effect on the power coupling. For example, rough or unpolished fiber ends not only contribute to separation losses, they may also scratch or fracture an adjacent polished fiber end. Losses may also occur if the fiber ends lack perpendicularity when joined, which may be caused by uneven polishing. Still other losses may occur where the fiber ends are over polished, thereby producing convex shaped ends that affect the transfer of light.

Before conducting the polishing step, special holding jigs or fixtures, such as the aligning device 100 in FIG. 1, are used in an effort to align or level the fibers relative to each other before contact with a polishing apparatus. As shown in FIG. 1, the fibers 110 are threaded through aligning stems or receptacles 120 so as to protrude below the leveling body 130. Note that the illustrated length of the fiber ends 110a protruding below the leveling body 130 has been exaggerated for clarity. Also, the fiber ends are typically surrounded by a ceramic material for stability and ease of handling.

After the individual fibers are leveled relative to each other, the fiber ends are polished. However, even if the fibers are leveled properly, great care must be taken during the polishing process to ensure the fiber ends are not over-polished or under-polished. As described above, if the fibers experience different polishing rates optical losses may result, which are caused by lack of perpendicularity of the fiber ends, rough edges, excessive separation, or the like.

During a polishing operation, pressure is applied to the polishing pad as it spins or rotates about its own central axis while revolving (i.e., rotating in a circular or elliptical manner) with respect to the leveling device so as to polish the fiber ends. Ideally the leveling device would be maintained in a substantially parallel and horizontal relationship with the polishing pad so that each of the leveled fibers is polished to the same extent with the same pressure. In practice, however, even small mechanical, pressure, and/or alignment inconsistencies cause the leveling device to tilt with regard to the polishing pad, such that the fiber ends experience different polishing rates.

The defective fibers caused by uneven polishing are not discovered until the fibers are tested, which is after the polishing process. If a sufficient number of defective fibers are produced, the polishing machine must be taken off-line so that it can be checked and calibrated. Also, the defective fibers must be re-polished. Such inefficiencies caused by the equipment downtime and the rework of the fibers results in production delays.

Accordingly, there exists a need for a polishing apparatus that can more precisely monitor and adjust the pressure that is exerted by a polishing pad on optical fibers that are being polished to ensure polishing uniformity. There is also a need to monitor the tilt between the leveling device and the polishing pad. Moreover, a need exists for an apparatus for determining and calibrating the actual pressure existing between the optical fibers and polishing pad during the polishing process.

SUMMARY OF THE INVENTION

The present invention is therefore directed to a calibrating apparatus and method for a polishing machine that substantially overcomes one or more of the problems due to the limitations and disadvantages of the conventional art.

In general, the present invention includes a ferrule surrounding a polishing pad and a plurality of infrared (IR) sensors attached to an upper surface of the ferrule. Each of the IR sensors is directed at a location where optical fibers, extending downwardly from a leveling device, contact the polishing pad. The sensors detect a heat signature generated by friction at the contact point between the optical fibers and the polishing pad as the polishing pad spins and revolves relative to the leveling device. The heat signature that is generated corresponds to the pressure existing between the optical fibers and the polishing pad.

In another aspect, the present invention provides a method of calibrating an optical fiber polishing machine, where the polishing machine has a polishing pad and a leveling device having a plurality of optical fiber ends extending downwardly from a lower surface thereof. The method includes steps of rotating the polishing pad and contacting the optical fibers to the polishing pad. The heat signature generated by friction between the optical fibers and the polishing pad is then detected by a plurality of sensors. The pressure existing between the optical fibers and the polishing pad is determined as a function of the heat signature detected by the sensors.

The horizontal orientation between the leveling device and the polishing pad can also be determined by the heat signature detected by the sensors. The leveling device is considered horizontal or parallel to the polishing pad if the heat signature detected by each of the plurality of sensors is equal. The leveling device is considered to be tilted relative to horizontal if the heat signature detected by each of the plurality of sensors is not equal.

In addition, a pressure transducer can be placed in the polishing machine for measuring a pressure applied by the optical fibers on the polishing pad. This measured pressure can then be checked or calibrated using the pressure sensed by the plurality of sensors.

BRIEF DESCRIPTION OF THE DRAWINGS

The foregoing and other objects, aspects and advantages will be described with reference to the drawings, in which:

FIG. 7 is a more detailed perspective view of the calibration apparatus of the present invention.

DETAILED DESCRIPTION OF THE PREFERRED EMBODIMENTS

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

Figure 2:
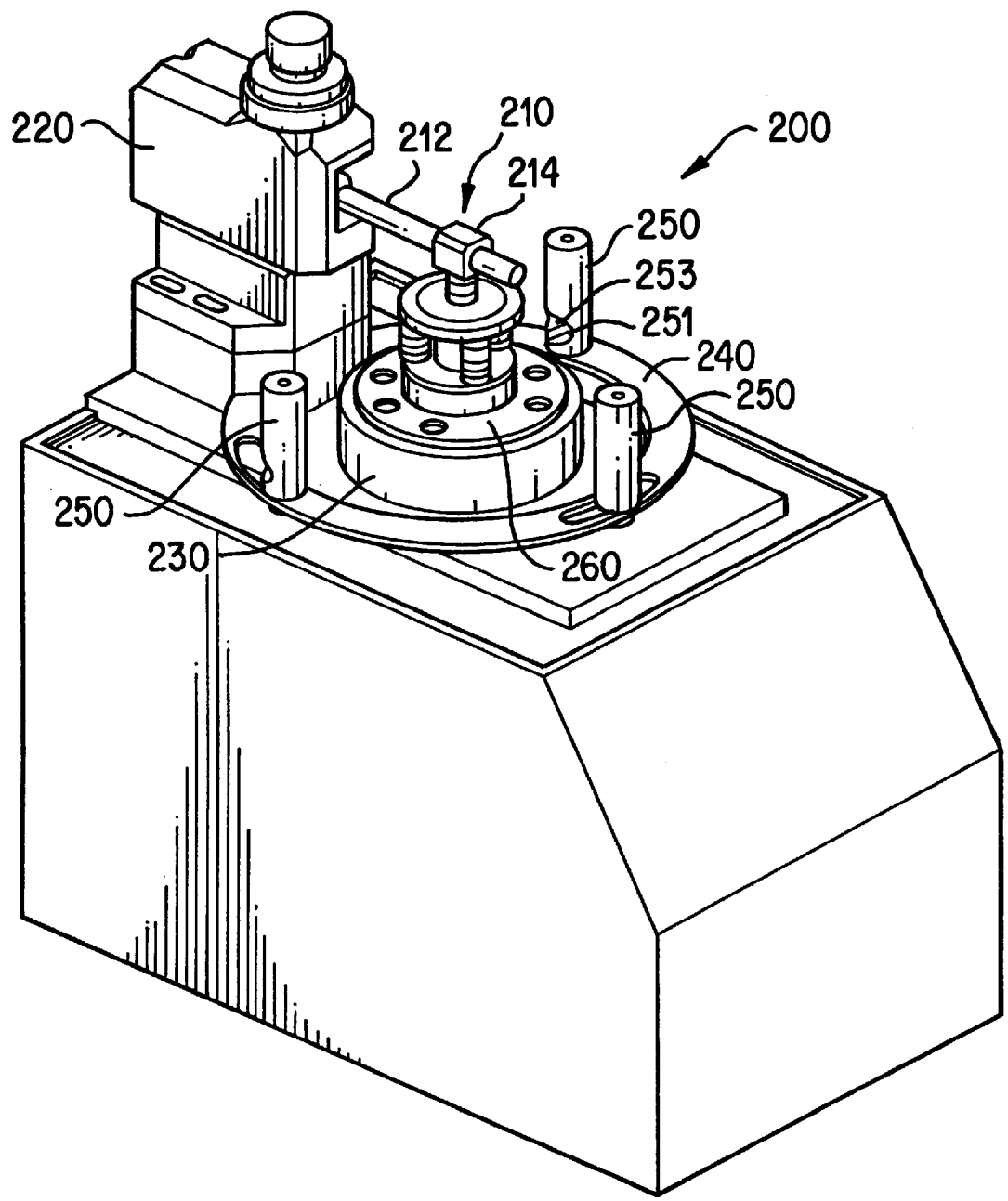
FIG. 2 is a perspective view of a polishing arm with a calibration apparatus in accordance with the present invention.

FIG. 2 illustrates the overall polishing apparatus 200 in accordance with the present invention. The polishing apparatus 200 includes a polishing arm 210 connected to a support 220 via a rod 212 such that the polishing arm 210 is vertically arranged over a polishing pad 230. As shown in FIG. 2, the rod 212 extends from the support 220 and passes through a sleeve 214 located at the top part of the polishing arm 210. A motor (not shown) or other equivalent means is used to selectively bring the polishing arm 210 into contact with the polishing pad 230 by moving the rod up or down. After contacting the polishing pad 230, the vertical pressure applied by the polishing arm 210 on the polishing pad 230 would also be controlled by the operation of the motor. Other methods of connecting the support 220 to the polishing arm 210 may be employed within the scope of the present invention, so long as the polishing arm 210 is vertically arranged over the polishing pad 230 and can be brought into contact with the polishing pad. For example, the polishing pad 230 itself may be movable in a vertical direction to contact a stationary polishing arm 210.

Figure 1:
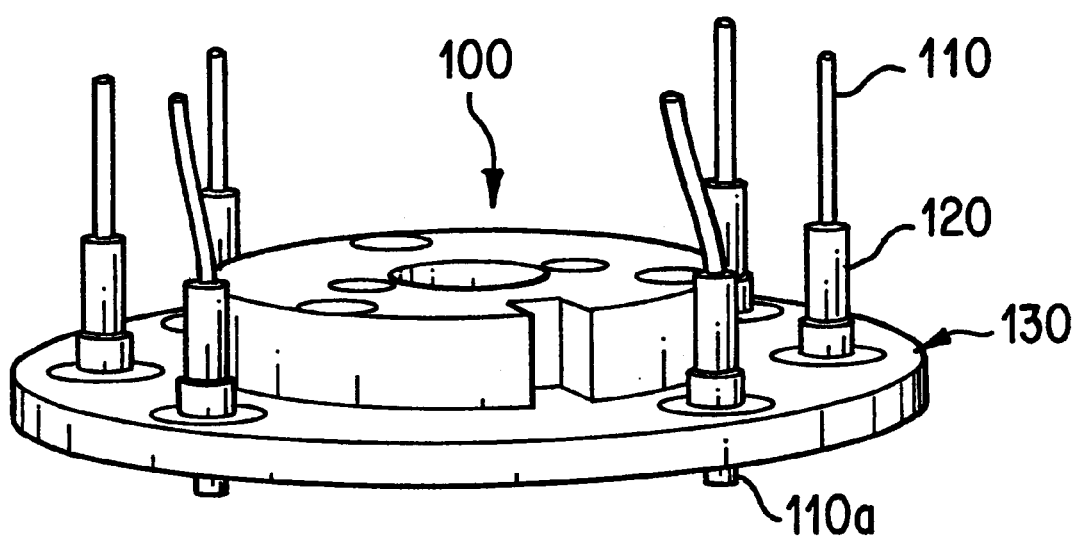
FIG. 1 is a perspective view of a conventional aligning device for aligning optical fibers.

A leveling device 260 is detachably attached to the lower end of the polishing arm 210 by a magnet, as described more fully later. Similar to FIG. 1, the leveling device 260 contains a plurality of optical fibers having their ends extending from a bottom surface of the leveling device so as to contact the polishing pad 230. The polishing pad 230 generally contains a diamond slurry for polishing the optical fibers, although other polishes may be used as well.

The polishing arm 210 and polishing pad 230 are surrounded by a ferrule 240. The ferrule 240 provides attachment points for a plurality of sensors 250. The sensors 250 are capable of detecting the heat signature emanating from the interface between the polishing arm 210 and the polishing pad 230. More specifically, the sensors would be directed at the points where the optical fiber ends extending from the bottom surface of the leveling device 260 contact the polishing pad 230. The operation of the sensors 250 will be described in greater detail later in this specification.

Figure 3:
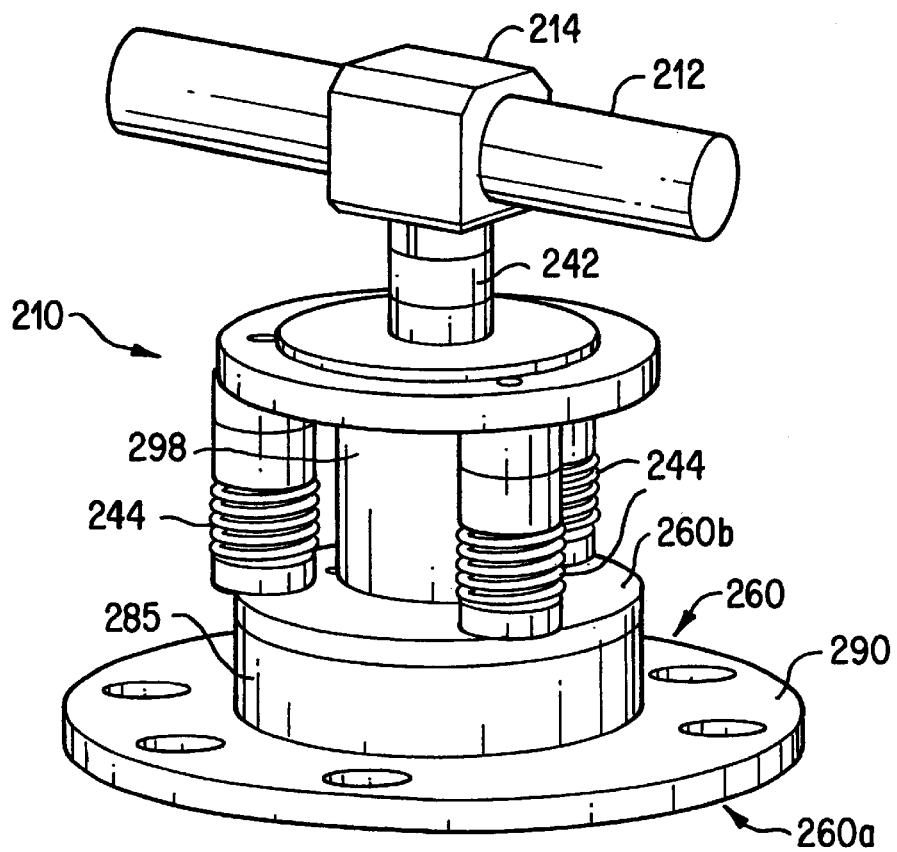
FIG. 3 is a perspective view of the polishing arm of the polishing apparatus of FIG. 2.
Figure 4:
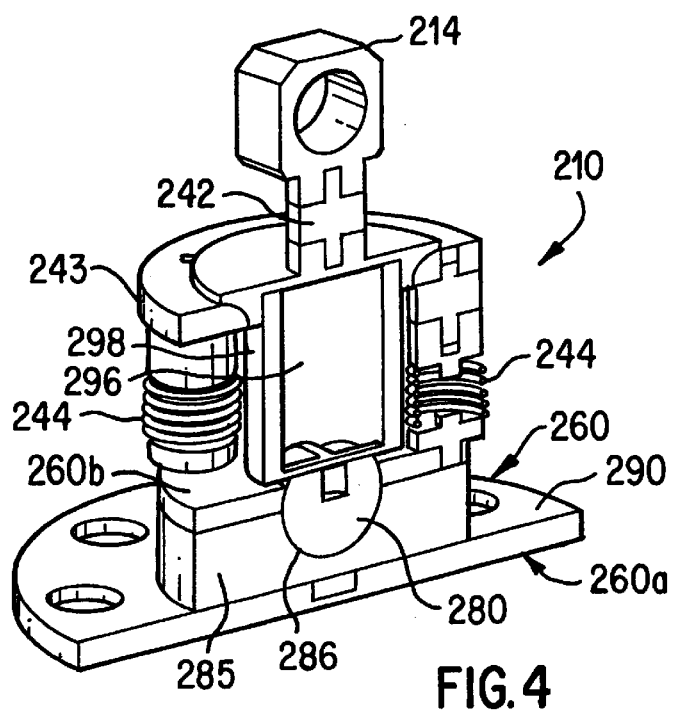
FIG. 4 is a cut away side view of the polishing arm of FIG. 3.

FIG. 3 is a more detailed perspective view of the polishing arm 210 of the polishing apparatus of FIG. 2, and FIG. 4 is a cut away side view of the polishing arm of FIG. 3. When the polishing apparatus 200 is operating, a designated amount of downward pressure is applied to the polishing arm 210 so that the leveling device 260, attached to the lower end of the polishing arm 210, contacts the polishing pad 230 to polish the plurality of optical fibers ends 261 extending from the bottom surface 260a (see FIG. 6) of the leveling device 260.

The amount of downward pressure, and how it is distributed over the surface of the leveling device 260, has a significant effect on the resulting polishing rates and polishing uniformity of the optical fibers. To facilitate the measurement and monitoring of the applied pressure, the polishing arm 210 incorporates a load cell 242 at an intermediate portion above the leveling device 260 but below the attachment point of the polishing arm 210 to the support 220. In FIG. 3 for example, the load cell 242 is located just below the sleeve 214. The load cell 242 may be selected from any commercially available source. The load cell 242 is essentially a pressure transducer, whereby changes in pressure applied on the load cell cause changes in the material properties of the ceramic or metallic material constituting the load cell. These changes in the material properties of the load cell cause corresponding changes in the electrical properties of the load cell, thereby altering the voltage that is output from the load cell. The output voltage from the load cell 242 is then input to a central processing unit (CPU) of a device for controlling the application of the pressure by the polishing arm 210. For example, the CPU may control the motor (not shown) that in turn controls the vertical application of pressure by the polishing arm 210 on the polishing pad 230. It is understood that the present invention may incorporate any conventional means of adjusting the pressure applied by the polishing arm 210.

The pressure experienced along the entire interface of the leveling device 260 and polishing pad 230 is balanced through a plurality of springs 244 spaced between an upper polishing arm plate 243 and an upper surface 260b of the leveling device 260. As shown in FIG. 3, three springs 244 are spaced equidistantly around the circumference of the upper surface 260b to balance the pressure distribution on the leveling device 260. For example, if 1000 grams of pressure is applied by the polishing arm 210 on the polishing pad 230, each of the three springs 244 should experience a compressive force of approximately 333 grams. While a single central spring or two spaced apart springs 244 may be employed, it is preferable to have at least three springs 244 for stable pressure distribution. Of course, more than three springs 244 may be employed for more precise pressure application and a more balanced pressure distribution. Alternatively, the springs 244 may be replaced by additional load cells 314 as shown in FIG. 7 to provide dynamic balancing of the pressure between the polishing pad 230 and the leveling device 260.

The magnetic attachment of the leveling device 260 to the polishing arm 210 will now be described with reference to FIG. 4, and with further reference to FIG. 5 and FIG. 6. FIG.

Figure 5:
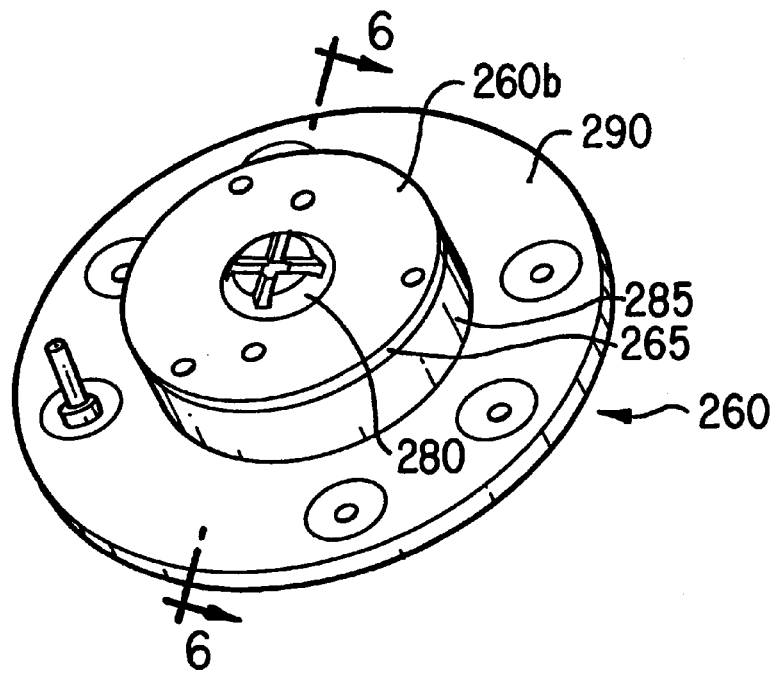
FIG. 5 is a perspective view of a leveling device used with the polishing arm in accordance with the present invention.
Figure 6:
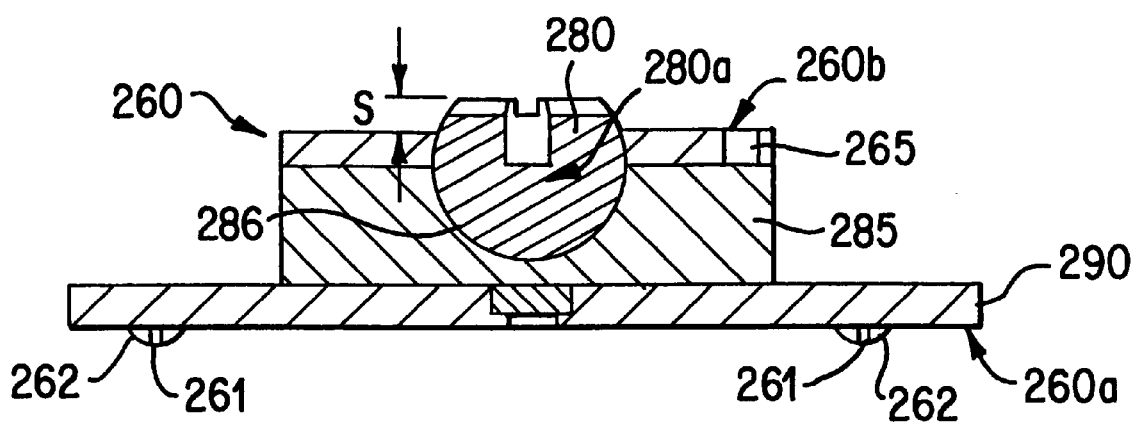
FIG. 6 is a cross-sectional view of the leveling device of FIG. 5 taken along the line 6—6.

5 is a more detailed perspective view of the leveling device 260 and FIG. 6 is a cross-sectional view of the leveling device 260 taken along the line 6—6 of FIG. 5.

The leveling device 260 houses a centrally located magnetic ball 280. The magnetic ball 280 is placed in a housing 285 disposed on a base plate 290. The housing contains a semi-spherical recess 286 for accommodating the magnetic ball 280. As shown in FIG. 4, the polishing arm 210 contains a magnet 296 disposed within a central housing 298. The magnet may be either a permanent magnet or an electromagnet. In either case, the lower surface of the magnet 296 contacts the upper surface of the magnetic ball 280, and the magnetism between the magnetic ball 280 and magnet 296 form a magnetic bond of sufficient strength to ensure that the leveling device 260 remains attached to the polishing arm 210 throughout the polishing process.

Notice that in FIG. 6 the contact surface between the housing 285 and the magnetic ball 280 covers approximately 50% of the outer spherical surface 280a of the magnetic ball 280. This particular arrangement maximizes the magnetic surface contact between the magnetic ball 280 and the housing 285, while still allowing the magnetic ball 280 to be removed from the housing 285 should it be necessary to conduct maintenance or adjust the alignment of the polishing arm. In such an embodiment, an upper housing plate 265 is used to retain the magnetic ball 280 in place as shown in FIG. 4 and FIG. 6.

On the other hand, if the housing 285 covers more than 50% of the outer spherical surface 280a of the magnetic ball 280, the magnetic bond between the magnetic ball 280 and the housing 285 would be greater, but the magnetic ball 280 could not be readily removed from the housing 285. In such an embodiment, it would thus not be necessary to use the upper housing plate 265 to retain the magnetic ball 280. However, it is preferable to use the embodiment incorporating the upper housing plate 265 for ease of assembly and maintenance. The recess 286 of the housing 285 can be coated with a stick-free, heat-resistant, scratch-resistant coating, such as TEFLON, to minimize friction between the magnetic ball/housing interface.

During the operation of the polishing apparatus, the polishing pad 230 spins around its own axis while revolving in an elliptical or circular pattern with respect to the leveling device 260 to polish the optical fibers. Preferably, the magnetic force or bond between the magnetic ball 280 and the housing 285 should be of sufficient strength to prevent the housing 285 from spinning as a result of the rotation of the polishing pad 230, while still allowing the leveling device 260 to tilt in a horizontal plane, with the horizontal plane being defined by the surface of the polishing pad 230. Referring to FIG. 4 and FIG. 6, note that the magnetic ball 280 extends above the upper surface 260b of the leveling device 260 where it contacts the magnet 296. This spacing 'S' thus allows the leveling device 260 to tilt in the horizontal plane. The ability to control the tilt of the leveling device 260 helps to ensure polishing uniformity across the optical fibers. Note that the amount of magnetic force required will vary depending on the characteristics of the polishing arm, leveling device, polishing pad, the number of fibers being polished, and the like. Such a determination can be made by one of ordinary skill in the art without undue experimentation.

Referring to FIG. 2 and FIG. 7, the calibration of the polishing apparatus 200 will now be discussed. Although commercially available load cells provide very accurate measurements, the actual pressure distribution experienced at the interface between the leveling device 260 and the polishing pad 230 may be slightly different, due to mechanical inconsistencies, environmental factors, alignment errors and the like. Therefore, even if the measured pressure distribution on the polishing pad 230 is uniform, the actual pressure may vary beyond designated tolerable limits. If too much pressure is applied, the optical fibers will be over-polished, while if too little pressure is applied, the optical fibers will be under-polished. Also, the horizontal orientation of the leveling device 260 should be monitored to ensure that the optical fibers 261 are evenly polished across a horizontal cross section (see FIG. 6).

In an effort to determine the actual amount and distribution of pressure applied by the polishing arm 210 on the polishing pad 230, the plurality of sensors 250 attached to the ferrule 240 surrounding the polishing pad 230 are used. The sensors are preferably infrared (IR) sensors for detecting the heat generated by the friction between the polishing pad 230 and the optical fibers. In the illustrated embodiment, each of the sensors 250 comprises a mirror 251 that is directed, though an aperture 253 in the sensor 250, at the interface between the leveling device 260 and the polishing pad 230.

More specifically, as shown in FIG. 6, each of the optical fibers 261 is surrounded by a ceramic material 262, such as zirconia, to provide support and protection for the fiber ends. Therefore, referring to FIG. 2 and FIG. 7, the mirror 251 is directed at the location where the ceramic 262 contacts the polishing pad 230. When the polishing pad 230 spins and revolves, the infrared sensors 250 sense the heat generated by the friction between the ceramic 262 and the polishing pad 230. This infrared sensing of the heat is represented by dotted lines 'SH' in FIG. 7. Note that the circumferential position of the infrared sensors 250 along the ferrule 240 may be adjusted by loosening the nut 321 at the bottom of the sensor 250, moving the sensor along the slot 320 formed in the ferrule 240, and then tightening the nut 321.

There is a correlation between the amount of pressure exerted by the polishing arm 210 on the polishing pad 230 and the amount of heat generated at the contact points between the ceramic 262 and the polishing pad 230. In other words, a certain amount of optimal pressure exerted by the polishing arm 210 will generate a defined amount of heat during the polishing process. By recognizing the optimal pressure as a function of the heat generated, the IR sensors 250 can thus determine whether too much or too little pressure is being exerted on the polishing pad 230. This information can then be used to calibrate the load cell 242 for adjusting the pressure of the polishing arm 210 since the IR sensors 250 provide a more accurate reading. The measurement of the heat signature, and the correlation between the heat signature and the pressure exerted on the polishing pad, can be determined using any suitable processing device without undue experimentation.

In addition, by having the IR sensors 250 spaced around the circumference of the polishing pad 230, it can be determined whether the leveling device 260 is completely horizontal with regard to the polishing pad 230 when the downward pressure is applied by the polishing arm 210. If the leveling device 260 is completely horizontal, the heat sensed by each of the IR sensors 250 spaced around the polishing pad 230 will be the same. On the other hand, if the leveling device 260 is tilted, greater pressure will be experienced by those fiber ends 261 where the leveling device 260 tilts toward the fiber ends, thereby generating more friction and heat, and less pressure will be experienced by those fiber ends where the leveling device 260 tilts away from the fiber ends, thereby generating less friction and heat. This differential heat signature is indicative of a leveling device 260 that does not contact the polishing pad in a completely horizontal manner.

Although two sensors 250 may be employed, it is preferable that at least three sensors 250 be used. Of course, the greater the number of sensors, the greater the accuracy of the measurement of the amount and distribution of the applied pressure. For example, if the number of sensors employed equaled the number of optical fibers being polished, one senor could be directed at each optical fiber end.

As disclosed above, the present invention provides numerous advantageous over conventional polishing machines. For example, the integrated load cell allows an operator to efficiently monitor the pressure exerted by the polishing arm on the polishing pad to ensure an equal pressure distribution on the polishing pad. The magnetic attachment of the leveling device and the polishing arm provides the ability to monitor the tilt of the leveling device to ensure polishing uniformity across the optical fibers. Also, the calibration sensors can validate the load cell measurements and can determine whether too much or too little pressure is being exerted on the polishing pad, and whether the leveling device is completely horizontal with regard to the polishing pad.

Although preferred embodiments of the present invention have been described in detail herein above, it should be clearly understood that many variations and/or modifications of the basic inventive concepts herein taught, which may appear to those skilled in the art, will still fall within the spirit and scope of the present invention as defined in the appended claims and their equivalents.

Having thus described our invention, what we claim as new and desire to secure by Letters Patent is as follows:

1. A calibration apparatus for a polishing machine, comprising:
   a polishing pad;
   a polishing arm vertically arranged above said polishing pad;
   a leveling device attached to a lower end of said polishing arm, said leveling device having a plurality of optical fiber ends extending downwardly from a lower surface thereof for contacting said polishing pad;
   a ferrule surrounding said polishing pad wherein said polishing pad is disposed within a central opening of said ferrule; and
   a plurality of sensors attached to said ferrule.

2. The calibration apparatus of claim 1, wherein each of said plurality of sensors is directed at a location where said optical fibers, extending downwardly from said leveling device, contact said polishing pad.

3. The calibration apparatus of claim 2, wherein said plurality of sensors are equidistantly spaced around an upper surface of said ferrule.

4. The calibration apparatus of claim 3, wherein said plurality of sensors are infrared sensors that detect a heat signature generated by friction at said contact between said optical fibers and said polishing pad as said polishing pad spins and revolves relative to said leveling device.

5. The calibration apparatus of claim 4, wherein each of said plurality of sensors comprises an aperture and a mirror, said mirror being oriented at a designated angle such that said heat signature can be detected through said aperture in said sensor.

6. The calibration apparatus of claim 5, wherein said plurality of sensors equals three.

7. The calibration apparatus of claim 5, wherein said plurality of sensors equals a number of said optical fibers extending downwardly from said leveling device, and wherein each of said plurality of sensors is directed at a corresponding optical fiber.

8. The calibration apparatus of claim 1, said ferrule having a plurality of slots formed therein, and wherein each of said plurality of sensors is movable along corresponding of said slots to adjust a circumferential position of said sensors.

9. A method of calibrating an optical fiber polishing machine, said polishing machine including a polishing pad and a leveling device having a plurality of optical fiber ends extending downwardly from a lower surface thereof, said calibrating method comprising:
   rotating said polishing pad around a central axis of said polishing pad while revolving said polishing pad relative to said leveling device;
   contacting said optical fibers to said polishing pad;
   detecting a heat signature generating by friction between said optical fibers and said polishing pad; and
   determining a pressure existing between said optical fibers and said polishing pad as a function of said detected heat signature.

10. The method of claim 9, wherein said detecting step comprises
   placing a plurality of infrared sensors around said polishing pad, and
   orienting said sensors toward a location where said optical fibers contact said polishing pad.

11. The method of claim 10, further comprising determining a horizontal orientation between said leveling device and said polishing pad, wherein said leveling device is determined to be horizontal if said heat signature detected by each of said plurality of sensors is equal, and wherein said leveling device is determined to be tilted relative to horizontal if said heat signature detected by each of said plurality of sensors is not equal.

12. The method of claim 11, further comprising:
   placing a pressure transducer in said polishing machine for measuring a pressure existing between said optical fibers and said polishing pad;
   checking said pressure measured by said pressure transducer with said pressure determined using said sensors; and
   adjusting said measured pressure in response to said determined pressure.

* * * * *